United States Patent
Burman et al.

[15] 3,673,384
[45] June 27, 1972

[54] INTEGRATED CIRCUIT EXTRACTOR TOOL

[72] Inventors: Per Aron Burman, Temple City; Harold E. Drew, Arcadia, both of Calif.

[73] Assignee: Burroughs Corporation, Detroit, Mich.

[22] Filed: Nov. 2, 1970

[21] Appl. No.: 86,061

[52] U.S. Cl. ............................219/230, 29/203 H, 81/9.5 B, 81/303, 219/233, 219/240, 228/57
[51] Int. Cl. ..................H05b 1/00, B25b 7/02, B23k 3/00
[58] Field of Search .....................219/221, 227, 228–241, 219/533, 230, 231, 233; 83/170, 171; 30/140; 81/9.5 R, 9.5 A, 9.5 B, 9.51, 303, 304, 307, 311, 312; 29/203 H, 203 HM, 427, 203 HT; 228/19, 51–55, 57, 44

[56] References Cited

UNITED STATES PATENTS

| 303,460 | 8/1884 | Sebastian | 81/303 X |
| 1,281,990 | 10/1918 | Mehan | 81/303 |
| 3,518,993 | 7/1970 | Blake | 81/303 X |
| 3,143,635 | 8/1964 | Hooker | 219/221 |
| 3,529,760 | 9/1970 | Hickman et al. | 219/229 X |
| 3,230,338 | 1/1966 | Kawecki | 219/229 X |
| 2,768,276 | 10/1956 | Arntzen | 219/230 UX |
| 2,978,565 | 4/1961 | Sullivan et al. | 219/221 X |
| 3,343,433 | 9/1967 | Rozmus | 81/9.5 B |

FOREIGN PATENTS OR APPLICATIONS

| 300,162 | 3/1955 | Switzerland | 219/233 |

*Primary Examiner*—A. Bartis
*Attorney*—Christie, Parker & Hale

[57] ABSTRACT

A hand tool is described for removing integrated circuit components or the like from printed circuit boards. The tool has a plierlike action for bringing a pair of heated jaws each provided with a flat electric resistance heater against the component leads for melting the solder attaching the component to the board. An adjustable stop prevents the heated jaws from contact and damaging the board. A pair of pincer jaws are mounted on one of the heated jaws so as to be movable in a direction transverse to the direction of movement of the heated jaws. Cams on the pincer jaws are actuated by the other heated jaw to close the pincer jaw in response to closure of the heated jaws. The pincer jaws have a turned end for gripping beneath a component for lifting the component after the solder is melted.

16 Claims, 7 Drawing Figures

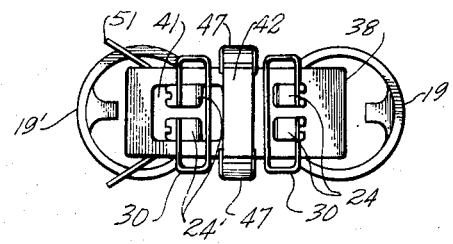
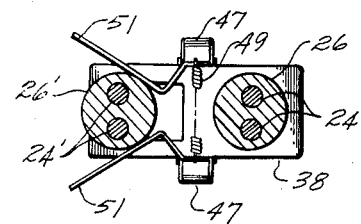
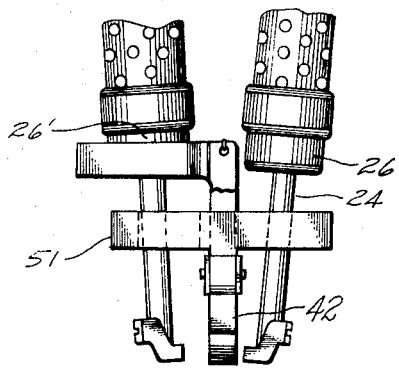
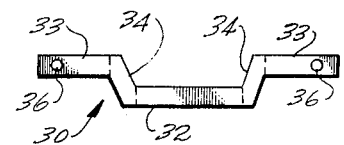
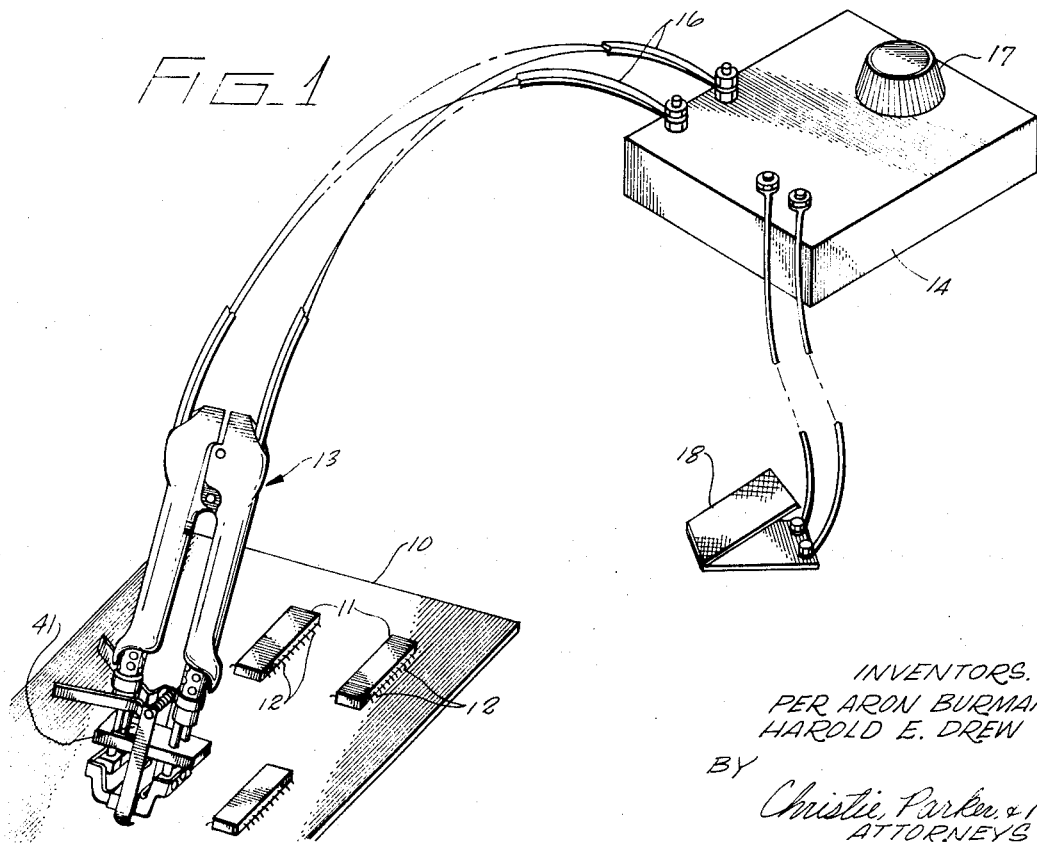
INVENTORS.
PER ARON BURMAN
HAROLD E. DREW
BY
Christie, Parker & Hale
ATTORNEYS PATENTED JUN 27 1972
3,673,384
SHEET 2 OF 2
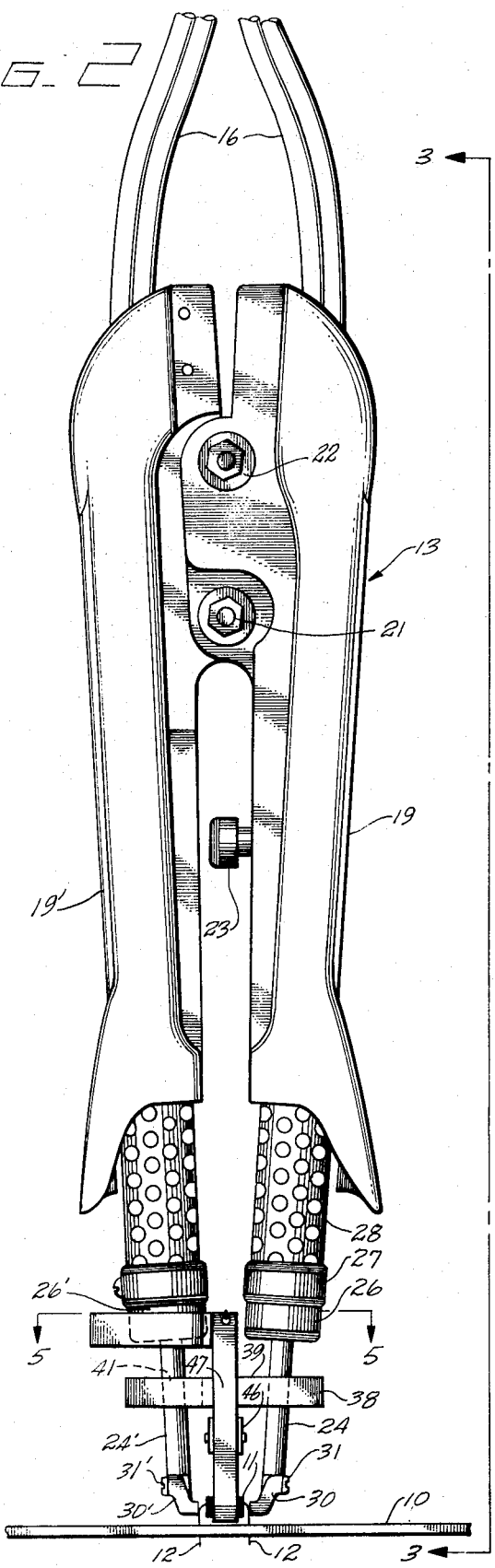
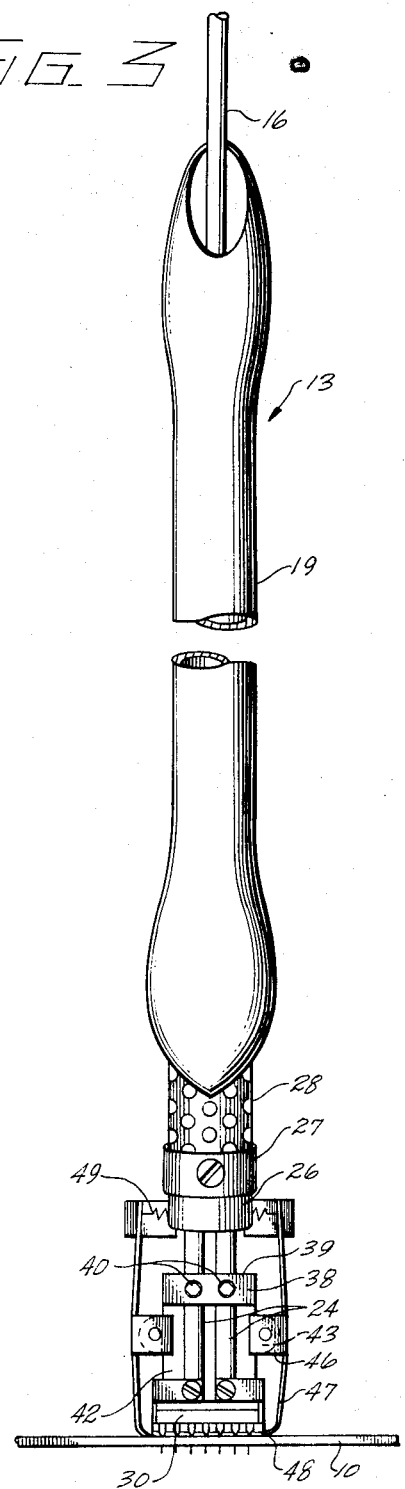

3,673,384

INTEGRATED CIRCUIT EXTRACTOR TOOL

BACKGROUND OF THE DISCLOSURE

This invention is in the field of hand tools and particularly heating, clamping and pulling tools useful for removing components from printed circuit boards.

A substantial problem in handling printed circuit boards is the removal of components therefrom. If a printed circuit board is damaged or becomes obsolete, it may be desirable to remove components for salvage, or if a component fails or is otherwise unsatisfactory, it may be desired to remove an individual component from the board. The problem becomes particularly acute with the advent of multiple lead integrated circuit components which actually include many circuit elements in an individual package. Such individual packages of integrated circuits form the components soldered to the printed circuit board.

In one type of integrated circuit component which is widely used, 14 leads in two parallel rows of seven each are inserted through holes in a printed circuit board. These 14 leads protrude a short distance through the opposite side of a printed circuit board from the component package and are often clinched over at a small angle. The leads, whether or not clinched, are soldered to conductors on the printed circuit board for completing electrical circuits and also to provide mechanical strength. The solder forms a principal mechanical attachment of the integrated circuit package to the printed circuit board. The aforementioned integrated circuit component having 14 leads is normally about ¾ths inch long and ¼th inch wide and because of the rows of leads arranged along the sides of the component, it can be gripped for removal only at the ends. In other integrated circuit components, greater numbers and other arrangements of leads are provided for soldering through printed circuit boards in substantially the same manner.

In the past, the removal of integrated circuit components from printed circuit boards has been very time consuming, and a substantial scrap rate due to damaged components has been encountered. When such removal is effected in a manufacturing situation, special heating apparatus for heating the leads on one side of the board while removing the component on the other side may be employed. This is of importance since the solder on all of the leads must be melted at the same time in order to withdraw the component from the board without damage. In operations where it is desired to replace an integrated circuit component in the field, heating of the several leads while simultaneously lifting the component from the board, is a difficult and at times almost insurmountable task. Damage to the components or the board or burning of the operator, are always substantial risks. It is, therefore, desirable to have a safe and reliable hand tool for removing integrated circuit components from a printed circuit board.

BRIEF SUMMARY OF THE INVENTION

Thus, in practice of this invention according to a presently preferred embodiment, there is provided a hand tool having one fixed heated jaw, a movable heated jaw movable towards and away from the fixed heated jaw, a pair of pincer jaws mounted for movement in a direction transverse to the direction of closure of the heated jaws, and means for moving the pincer jaws in response to movement of the movable heated jaw.

DRAWINGS

These and other features and advantages of the invention will be appreciated as the same becomes better understood by reference to the following detailed description of a presently preferred embodiment when considered in connection with the accompanying drawings, wherein:

FIG. 1 illustrates, in perspective, a hand tool constructed according to principles of this invention;

FIG. 2 is a side view of the hand tool of FIG. 1;

FIG. 3 is another view of the tool in a direction transverse to that of FIG. 2;

FIG. 4 is a bottom view of the hand tool;

FIG. 5 is a transverse cross section through the tool of FIG. 2;

FIG. 6 illustrates the opened jaws of the hand tool in partial cutaway; and

FIG. 7 illustrates a flat blank foldable into a heater tip for the tool of FIG. 2.

Throughout the drawings, like numerals refer to like parts.

DESCRIPTION OF THE INVENTION

FIG. 1 illustrates, in perspective and somewhat schematically, an extractor tool for removing integrated circuit components from printed circuit boards. As illustrated in this embodiment, a printed circuit board 10 has a plurality of integrated circuit components 11 mounted thereon. Each of the components 11 has a row of leads 12 along each side, which leads are typically inserted through holes (not shown) in the printed circuit board and soldered thereto for use. When it is desired to remove a component 11 from the board, a hand tool 13 is employed to grip the component, heat the leads to melt the solder, and lift the component from the board.

The hand tool portion 13 is connected to a conventional power supply 14 by four leads 16 for conducting current to a pair of heated jaws of the hand tool 13, described in greater detail hereafter. The power supply 14 includes a rheostat or variable transformer 17 or the like, for controlling the power applied to the hand tool 13. It has been found particularly useful to employ an ON-OFF foot switch 18 in connection with the power supply 14 so that the operator's hands are left free for manipulating the hand tool and printed circuit board.

The hand tool portion 13 is illustrated in a pair of orthogonal views, FIGS. 2 and 3. Certain aspects of the hand tool are best seen in the bottom view of FIG. 4, and the transverse cross section of FIG. 5. The hand tool 13 has a pair of insulated handles 19 interconnected at a pivot 21 so as to move towards and away from each other in the general manner of pliers or other similar gripping tools. A stop 22 in a slot (not shown) inhibits the handles 19 from spreading too far apart under the urging of a spring (not shown), all of which is quite conventional. An adjustable stud 23 prevents the handles 19 from coming too close together.

Each of the handles 19 has a pair of metal rods 24, 24' extending from the forward or lower end thereof, with each of the rods in electrical connection with one of the leads 16 to the power supply. The two rods 24, 24' on each handle are held in place by a cylindrical sheath 26, 26' of heat resistant plastic or ceramic. A metal sleeve 27 holds a perforated shield 28 around the rods 24, 24' in the portion where they enter the handles 19, thereby serving to dissipate a portion of the heat generated in the hand tool and keep the handles cool. The structure as described to this point, is a standard commercial item such as may be employed as a thermal wire stripper.

The two legs of the hand tool 13 are basically similar, however, for purposes of exposition, it is convenient to distinguish the two legs and the associated jaws by designating the components of one which can be considered to be fixed in position by ordinary reference numerals, and the other jaw which can be considered movable by similar reference numerals primed. Thus, the fixed leg of the hand tool terminates in a heated jaw 30 having its ends connected to its pair of rods 24 by a pair of bolts 31. In the same manner, the movable leg terminates at its lower end in a heated jaw 30' having its ends connected to its pair of rods 24' by bolts 31'.

Each of the heated jaws 30, 30' is in a rather box-like form bent from a flat blank such as illustrated in FIG. 7. The dashed lines on the blank of FIG. 7 indicate the lines along which the blank is folded through about 90° in order to form the somewhat warped box-like structure. The jaw 30 has a central heater portion 32 connected at each end to a tab 33 by a diagonally extending portion 34. Holes 36 in the tabs 33 permit passage of the bolts 31, 31' (FIGS. 2–4). The central heater portion 32 on each of the jaws is flat and the heater portions on the opposed jaws 30 and 30' are parallel to each other.

The warped box-like structure permits the heated portion 32 of the two jaws to be closest to the circuit board 10 when the tool is in use, while the connector tabs 33 are relatively removed from the board which permits the use of the hand tool in situations where integrated circuit components are relatively close together. The rods 24 conduct current to the tabs 33 and hence to the heated portion 32 of the heater jaws which are thereby resistively heated, preferably to a red incandescent temperature. During use, the heater portions 32 on the opposed jaws are brought into contact with the leads 12, and the elevated temperature of the heated portion serves to melt solder on the leads by conduction thereto. Since the parallel heated jaws extend the full length of the integrated circuit component, all of the leads on both sides thereof are simultaneously heated when the two jaws are in contact therewith.

One end of the crossbar portion 38 of a T-shaped yoke 39 is fastened to the rods 24 of the fixed leg by a pair of set screws 40 (FIG. 3). The other end of the crossbar portion 38 of the T-shaped yoke has a rectangular opening 41 through which the rods 24' of the movable leg pass. The rectangular opening 41 serves to limit the permissible opening and closing of the movable leg relative to the fixed leg when the rods 24' come in contact with the edges of the opening. (This is in addition to and, during usual operation, supplants the limits provided by the stop 22 and stud 23). The leg 42 of the T-shaped yoke 39, extends towards the tip of the tool from the crossbar 38 and terminates in a flat portion which during operation rests against the top of an integrated component 11 as a positioning stop to prevent the heated jaws 30 and 30' from coming in contact with the printed circuit board 10. Typically, printed circuit boards are not formed of heat resistant materials and contact of a heated jaw against the surface of a board would cause severe damage thereto. The position of the T-shaped yoke 39 on the fixed rods 24 is adjusted before the set screws 40 are tightened so that the limit formed by the leg 42 is at a proper height to bring the heated jaws 30 and 30' against the leads 12 on a component 11 without precise manipulations by the operator. The depending leg 42 of the T-shaped yoke also includes a pair of pierced ears 43 for mounting a pair of pincer jaws 44.

The pincer jaws 44 are each in the general form of an inverted L and form an allochiral pair. A pair of parallel tabs 46 on the leg 47 of each L-shaped pincer jaw serves to mount each pincer jaw on an ear 43 on the T-shaped yoke 39 so that the pincer jaw is free to pivot in a direction transverse to the direction of relative movement of the heated jaws 30, 30'. At the lower end of each pincer jaw 44 (tip of the leg 47 of the inverted L) is an inwardly curved portion 48. The two curved parts 48 are directed towards each other so that during operation of the hand tool, they fit beneath opposite ends of an integrated circuit component 11 for lifting the component from a printed circuit board 10.

A spring 49 at the junction between the base and leg of the inverted L-shaped pincer jaws 44 interconnects the two pincer jaws and biases them together so that the curved ends 48 are biased apart. As best seen in FIG. 5, the base 51 of each L-shaped pincer jaw 44 is formed in a dog-leg shape so that the two bases 51 converge nearer the midline of the tool and diverge as they get further from the midline. Thus the base of each L-shaped pincer jaw has a camming portion angulated relative to the plane in which the principal portion of the jaw lies. The diverging bases 51 each bear against the cylindrical sheath 26' on the movable leg of the hand tool. Thus, as the movable leg is brought towards the fixed leg, the cylindrical sheath 26 cams the bases 51 of the pincer jaws further apart against the bias of the spring 49. This, in turn, causes the curved ends 48 of the pincer jaws to approach each other.

Thus, it will be seen that as the movable heated jaw 30 by pinching the handles of the hand tool, the pincer jaws are also cammed towards each other. Thus, when the heated jaws close against the leads on an integrated circuit component, the curved ends 48 of the pincer jaws move beneath the ends of the component. A lifting force applied to the tool causes the pincer jaws to lift the component from the board as soon as the solder melts.

In order to use the component extractor tool, it is preferred to first remove as much solder as possible from the region surrounding the leads by inverting the printed circuit board, and with a conventional desoldering tool, sucking away any excess solder. The leads extending through the printed circuit board are then preferably straightened so as to be perpendicular to the surface of the board so that the force required to remove the component from the board is minimized. The board is then placed in its upright position with the integrated circuit components exposed for contact by the extractor tool.

The rheostat or variable transformer 17 on the power supply 14 is adjusted to bring the heater jaws 30 and 30' to a red heat in 3 or 4 seconds after power is applied. When the power supply is properly adjusted, the footswitch 18 is closed thereby heating the jaws.

After preheating, the tool is placed over a component 11 on a printed circuit board and the handles 19 brought together, thereby closing the heated jaws 30, 30' against the leads 12 on the component, and simultaneously camming the tips 48 of the pincer jaws 44 beneath the ends of the component. 2 to 3 seconds is all that is required to melt the balance of solder on the leads. The component is then lifted from the board and power removed by release of the footswitch 18 so as to avoid any overheating of the component. The rapid removal so afforded, prevents the heated tips from damaging the printed circuit board, and components can be rapidly and safely removed even under field conditions.

Although but one embodiment of component extractor tool has been described and illustrated herein, many modifications and variations will be apparent to one skilled in the art. Thus, for example, other means may be provided for camming the pincer jaws in a direction transverse to the direction of movement of the heated jaws. Other details of yoke for limiting approach of the tool to the printed circuit board can be used. Many other modifications and variations will be apparent to one skilled in the art, and it is therefore to be understood that within the scope of the appended claims the invention may be practiced otherwise than as specifically described.

What is claimed is:

1. A circuit component extractor tool comprising:
   a pair of heated jaws;
   means for moving the heated jaws towards and away from each other for contacting a circuit component;
   a pair of pincer jaws adjacent the heated jaws for gripping the contacted component; and
   means responsive to movement of at least one of the heated jaws for moving the pincer jaws towards and away from each other in a direction orthogonal to the direction of the movement of the heated jaws, said pincer jaws moving towards each other when the heated jaws move towards each other and vice versa.

2. A tool as defined in claim 1 wherein the heated jaws comprise parallel opposed bare resistance elements; and further comprising:
   means for passing a controlled current through the resistance elements.

3. A tool as defined in claim 1, wherein the pincer jaws have opposed hooked ends for lifting engagement of a circuit component therebetween.

4. A tool as defined in claim 1 wherein the means for moving the heated jaws comprises pivot mounted handles.

5. A tool as defined in claim 1 wherein the means for moving the pincer jaws comprises a cam on each pincer jaw;
   means for mounting the pincer jaws on one heated jaw; and
   means on the other heated jaw for cooperating with the cams on the pincer jaws for camming the pincer jaws together.

6. A tool as defined in claim 1 further comprising means on said tool for limiting proximity of the tool to a circuit component between the heated jaws.

7. A hand tool comprising:
   a fixed jaw;

a movable jaw;

means interconnecting the fixed jaw and the movable jaw for movement towards and away from each other;

a pair of pincer jaws;

means for mounting the pincer jaws on the fixed jaw for movement in a direction transverse to the direction of relative movement of the fixed jaw and movable jaw; and means for moving the pincer jaws towards each other as a consequence of movement of the movable jaw towards the fixed jaw.

8. A hand tool as defined in claim 7 further comprising means for heating at least one of the fixed jaw and the movable jaw.

9. A tool as defined in claim 8 further comprising means for biasing the pincer jaws towards an open position; and wherein the means for moving the pincer jaws comprises cooperating camming means on said pincer jaws and movable jaw for camming the pincer jaws towards a closed position as the fixed jaw and movable jaw move towards a closed position.

10. A circuit component extractor tool comprising:

a pair of opposed handles movable in a first direction towards and away from each other at at least one end thereof;

a fixed jaw mounted on the end of one of the handles;

a movable jaw mounted on the end of the other handle so as to be opposed to the fixed jaw;

means for heating at least one of the movable jaw and the fixed jaw;

a pair of pincer jaws mounted on the fixed jaw for movement in a second direction transverse to the first direction;

means on the pincer jaws for gripping a circuit component; and means for moving the pincer jaws towards each other as a consequence of movement of the movable jaw towards the fixed jaw.

11. A tool as defined in claim 10 wherein the means for heating comprises:

a flat resistance heater on the fixed jaw;

a flat resistance heater on the movable jaw parallel and opposed to the heater on the fixed jaw; and means for passing a controlled current through the resistance heaters.

12. A tool as defined in claim 10 wherein the means for mounting the pincer jaws comprises:

a yoke attached to the fixed jaw, and a pivotal connection between the yoke and each of the pincer jaws; and wherein the yoke further comprises:

an adjustable stop between the fixed jaw and the movable jaw for controlling the position of the jaws relative to a circuit component.

13. A tool as defined in claim 12 wherein each of the pincer jaws comprises:

a camming portion; and the movable jaw includes a cam cooperating with the camming portion on the pincer jaws for camming the pincer jaws towards a closed position as the movable jaw and fixed jaw move towards a closed position; and means for biasing the pincer jaws towards an open position.

14. A tool as defined in claim 13 wherein each of the pincer jaws has an inverted L shape;

the means on the pincer jaws for gripping a circuit component comprises an inwardly hooked end adjacent the tip of the leg of the inverted L; and wherein the camming portion comprises a portion on the base of the inverted L angulated relative to the plane of the L.

15. A tool as defined in claim 13 wherein the yoke comprises a general T shape having:

one side of the cross bar of the T attached to the fixed jaw;

the base portion of the T lying between the fixed jaw and the movable jaw for defining the adjustable stop; and an aperture in the other side of the cross bar of the T disposed around a portion of the movable jaw for limiting movement thereof.

16. A tool as defined in claim 15 wherein the means for heating comprises:

a flat resistance heater on the fixed jaw;

a flat resistance heater on the movable jaw parallel and opposed to the heater on the fixed jaw; and means for passing a controlled current through the resistance heaters.

* * * * *